United States Patent Office 2,714,118
Patented July 26, 1955

2,714,118

RECOVERY OF CHEMICALS FROM BLACK LIQUOR

James E. Copenhaver, William A. Biggs, Jr., William H. Baxley, and John T. Wise, Hartsville, S. C., assignors to Sonoco Products Company, a corporation of South Carolina No Drawing. Application July 22, 1953, Serial No. 369,742

8 Claims. (Cl. 260—527)

This application is a continuation-in-part of our application Serial No. 323,144, filed November 28, 1952. In that application we disclosed a process of treating black liquor pulp mill effluent to remove harmful constituents detrimental to fish in streams receiving the effluent and to recover in reusable form certain components of the waste effluent commonly known in the trade as black liquor. The process disclosed and claimed in that application is characterized particularly by use of a combination solvent comprising an aliphatic alcohol and an aliphatic ester, the alcohol being highly soluble in water and the ester being relatively insoluble in water, the purpose of the combination solvent being to avoid emulsification of the black liquor which would otherwise occur if the ester were used alone.

In the prior application Serial No. 323,144, we disclosed, in addition to various aliphatic esters, for combining with various aliphatic alcohols, a certain ketone, namely, methyl ethyl ketone (2-butanone), which was an exception to the emulsification difficulty encountered with other higher molecular weight ketones when used alone. Thus, it was apparent that this specific chemical, methyl ethyl ketone, did not require the use of alcohols, since when used alone it would not produce an emulsion in the black liquor. From a number of subsequent experiments, we have found this definitely to be true and have discovered that methyl ethyl ketone offers decided advantages over other solvents, not only from the standpoint of avoiding the formation of emulsions in extracting acetic acid from black liquor, but also functions in other respects very efficiently for that purpose.

As disclosed in the above prior application, it is of commercial importance to recover from black liquor acetic acid, which is present in substantial amount, and formic acid, which is present in much smaller amount, for the purpose of reusing these chemicals commercially. This commercial aspect of the process is important in addition to reduction of the B. O. D. (biological oxygen demand) of the black liquor to minimize its adverse effects on fish and other life in streams receiving the black liquor from wood pulping plants. This is particularly true in plants producing pulp from a neutral sulfite or semi-chemical process, the black liquor from which has a very high B. O. D. value and aggravates the stream pollution problem. One of the most harmful constituents in the neutral sulfite semi-chemical black liquor from the B. O. D. standpoint is the acetic acid as acetate, and, as suggested, it is also important to remove this constituent for reuse in the chemical industry.

In accordance with the process of our present invention, the black liquor obtained from semi-chemical pulping processes or from other alkaline pulping processes, such as, for example, kraft and soda, is first concentrated to provide a desired percentage of solids, particularly the acetic acid constituent which is present originally in the liquor as an acetate salt, such as, for example, sodium, ammonium, potassium or magnesium acetates, and in the usual case it is desirable to concentrate the black liquor to a solids content of about 25% to 60%, as a result of which the acetic acid salt component is concentrated to an amount which renders it more practical for subsequent liberation and extraction.

Following this first step of concentrating the black liquor to a desired solids concentration, it is then acidified with a strong mineral acid, usually sulfuric acid, for the purpose of liberating the weaker acid, namely, acetic acid. The amount of sulfuric acid added for the purpose of liberating the acetic acid is generally a stoichiometric quantity with respect to the acetate and formate salts.

Following this acidification treatment of the black liquor with its liberation of the acetic acid, the next step in the process comprises the treatment of this acidified liquor with the extracting solvent, methyl ethyl ketone, which we have found to be particularly suited for this purpose. We have found that the methyl ethyl ketone may be used in either anhydrous or water saturated form, but that it is of commercial advantage to use the methyl ethyl ketone in water saturated form, since it avoids the necessity of dehydrating this solvent after each extracting operation. Also, the water saturated form of the solvent may be obtained as a binary from the distillation treatment of the acetic acid which has been extracted from the black liquor in each commercial run of the operation. The original water saturated form of the methyl ethyl ketone solvent or the binary resulting from the distillation operation contains about 10% to 15% water.

In certain prior uses of methyl ethyl ketone as a solvent in acetic acid aqueous solutions, it has been considered impractical to use it as such, that is, without combining the ketone with another organic solvent, because of its relatively high solubility in water. However, we have found that the high water solubility characteristic of this solvent does not prevent its use in the efficient extraction of acetic acid from black liquor solutions which contain, in addition to water, a substantial solids content, the desired percentage of which is obtained as a result of the first step in the process of this invention described above, namely that of concentrating the black liquor to a total solids concentration of about 25% to 60%. Under these conditions, the usual disadvantages attendant the high water solubility characteristic of the methyl ethyl ketone are avoided and it acts as an efficient extraction solvent for the acetic acid.

The solvent extraction process may be carried out with a conventional tower, utilizing counter-current flow principles, for bringing the black liquor in contact with the methyl ethyl ketone extracting solvent. However, we have obtained excellent results by using a more recent form of centrifugal, continuous, multistage, counter-current extractor manufactured by Podbielniak, Inc., Chicago, Illinois. This extractor is covered in a number of patents issued to W. J. Podbielniak, including Patent No. 2,003,308, issued June 4, 1935. By use of this type of apparatus, accurate and instantaneous control can be had of the phase contacting and separation by application of highly variable degrees of centrifugal force balanced to just effect complete separation and suspended solids removal in the raffinate without fouling the extractor. Furthermore, on shut-downs of the extractor, the liquid hold-up is only a few gallons against very large volumes in a counter-current gravity tower. Also, the use of this type apparatus reduces contact time between solvent and water phases to almost instantaneous contact.

The following is an illustrative but non-limiting example of the process of this invention. Black liquor from the neutral sulfite semi-chemical pulping process is concentrated to 25% solids content, this neutral concentrated black liquor is acidified with 66° Baumé (95%) sulfuric acid sufficient to liberate the acetic and formic acids, the acidified solution is contacted counter-currently in the Podbielniak extractor with about 1½ volumes of the methyl ethyl ketone solvent. The extract obtained is run through a solvent recovery column, and concentrated acetic and formic acids, containing a small percentage of solids dissolved from the liquor in the extraction operation, pass out of the bottom of the column. These concentrated acids containing dissolved solids are run through a rectifying column. The acetic and formic acids are taken as overhead.

In a typical commercial operation for extracting acetic acid from concentrated acidified black liquor in accordance with this invention, the water saturated methyl ethyl ketone solvent may be used in varying amounts and usually in the proportion of about 1 to 2 volumes for each volume of the concentrated acidified black liquor.

It will be understood from the foregoing description that one of the outstanding characteristics of the process of this invention is the use therein of an extracting solvent which prevents emulsion formation in the black liquor and at the same time has a high partition coefficient for the extraction of acetic acid from the black liquor, and which is efficiently utilized in spite of its high water solubility, by virtue of the "salting-out" effected by the liquor solids.

Another commercially valuable aspect of the methyl ethyl ketone and its use in the process of this invention is that it can be easily recovered after each extracting operation for reuse in the process with only relatively very small losses in the raffinate.

The acetic acid which has been extracted from the black liquor by treatment with the methyl ethyl ketone as described above is easily separated from the methyl ethyl ketone in concentrated form by azeotropic distillation; that is, the methyl ethyl ketone distills over with the water as a binary, leaving the acetic acid in concentrated form.

It is to be understood that references to "acetic acid" in the specification and claims herein is intended to include, in addition to the major proportion of acetic acid, the substantially smaller proportion of formic acid, both of which occur in the black liquor as salts.

We claim:

1. A process of treating black liquor obtained from pulping processes selected from the group consisting of neutral and alkaline pulping processes, comprising concentrating said black liquor to a solids concentration within the range of approximately 25% to 60%, acidifying the concentrated black liquor to liberate the acetic acid content, extracting the concentrated and acidified black liquor with methyl ethyl ketone, and separating the acetic acid from the methyl ethyl ketone.

2. A process of treating black liquor obtained from pulping processes selected from the group consisting of neutral and alkaline pulping processes, comprising concentrating said black liquor to a solids concentration within the range of approximately 25% to 60%, acidifying the concentrated black liquor to liberate the acetic acid content, extracting the concentrated and acidified black liquor with methyl ethyl ketone, the respective amounts of said black liquor and methyl ethyl ketone being in the ratio of approximately 1 volume of black liquor to 1 to 2 volumes of methyl ethyl ketone, and separating the acetic acid from the methyl ethyl ketone.

3. A process of treating black liquor to effect the removal therefrom of acetic acid, comprising concentrating said black liquor to a solids concentration of approximately 25% to 60%, acidifying the black liquor and extracting the concentrated and acidified black liquor with methyl ethyl ketone saturated with water, and separating the acetic acid from the extracting solvent.

4. A process of treating black liquor to effect the removal therefrom of acetic acid, comprising concentrating said black liquor to a solids concentration of approximately 25% to 60%, acidifying the black liquor and extracting the concentrated and acidified black liquor with a methyl ethyl ketone-water binary azeotrope, and separating the acetic acid from the extracting solvent.

5. In a process of treating acidified, concentrated black liquor having a solids content of approximately 25% to 60%, and containing acetic and formic acids to recover said acids, the step of mixing said black liquor with methyl ethyl ketone to effect separation of the acetic and formic acids from the black liquor.

6. In a process of treating acidified, concentrated black liquor having a concentration of approximately 40% solids, the step of contacting said liquor with methyl ethyl ketone to effect separation of the acetic and formic acids from the black liquor.

7. A process of treating black liquor to effect the removal therefrom of acetic acid, comprising concentrating said black liquor to a solids content of approximately 25% to 60%, acidifying the concentrated black liquor with sulfuric acid, and extracting the concentrated and acidified black liquor with methyl ethyl ketone and separating the acetic acid from the extracting solvent.

8. A process of treating black liquor to effect the removal therefrom of acetic and formic acids, comprising concentrating said black liquor to a solids concentration of approximately 25% to 60%, acidifying the black liquor and extracting the concentrated and acidified black liquor with methyl ethyl ketone containing 10% to 15% water.

References Cited in the file of this patent

UNITED STATES PATENTS

| | | |
|---|---|---|
| 1,298,481 | Drewsen | Mar. 25, 1919 |
| 2,033,978 | Dreyfus | Mar. 17, 1936 |

OTHER REFERENCES

Doering, Chem. Abstracts, vol. 38, column 4128 (1944).